United States Patent [19]

Gebelius

[11] Patent Number: 4,611,946
[45] Date of Patent: Sep. 16, 1986

[54] FLEXIBLE JOINT

[76] Inventor: Sven R. V. Gebelius, P.O. Box 15008, Bromma, Sweden, S-161 15

[21] Appl. No.: 689,047

[22] PCT Filed: Apr. 12, 1984

[86] PCT No.: PCT/SE84/00136
§ 371 Date: Dec. 6, 1984
§ 102(e) Date: Dec. 6, 1984

[87] PCT Pub. No.: WO84/04140
PCT Pub. Date: Oct. 25, 1984

[30] Foreign Application Priority Data

Apr. 15, 1983 [SE] Sweden .............................. 8302109

[51] Int. Cl.$^4$ ............................................ F16C 11/00
[52] U.S. Cl. .................................... 403/102; 403/291;
52/108; 135/114; 248/159
[58] Field of Search .................. 52/108, 113; 248/159,
248/160; 362/431, 145; 403/102, 291, 109, 119;
74/501 A, 501 M, 502; 135/112, 114; 446/331,
354

[56] References Cited

U.S. PATENT DOCUMENTS

| 870,429 | 11/1907 | Grimler | 135/114 X |
| 2,645,511 | 7/1953 | Rutledge | 403/110 X |
| 3,129,715 | 4/1964 | Militano et al. | 403/102 X |
| 3,295,699 | 1/1967 | Bavernschub | 403/102 X |
| 4,167,354 | 9/1979 | Walker | 403/109 X |

FOREIGN PATENT DOCUMENTS 2903664 9/1980 Fed. Rep. of Germany ........ 52/108
415697 4/1977 Sweden .

Primary Examiner—Cornelius J. Husar
Assistant Examiner—Joseph A. Fischetti
Attorney, Agent, or Firm—Holman & Stern

[57] ABSTRACT

Flexible joint, including at least two plate spring members (3, 3'), located separated from each other and extending substantially parallel in relation to each other, attached in connection to first and each other adjacently located end portions against a first element (1') and having opposed end portions movably attached against a second element (1). By introducing a substantially similar first displacement movement for the plate spring members (3, 3'), the elements (1, 1') can be separated from an abutting and linearly extending position, and by means of a continued and different displacement movement, the first element (1) is pivoted to an angularly different position of extension in relation to the second element (1). By influencing the plate spring members (3, 3') in such a way, that the movement is carried out in a reversed relationship, the first element (1') is pivoted back to a linear extending position in relation to the second element (1), and takes up the aforementioned abutting position, which abutting position also can be a telescopically embracing position.

11 Claims, 9 Drawing Figures

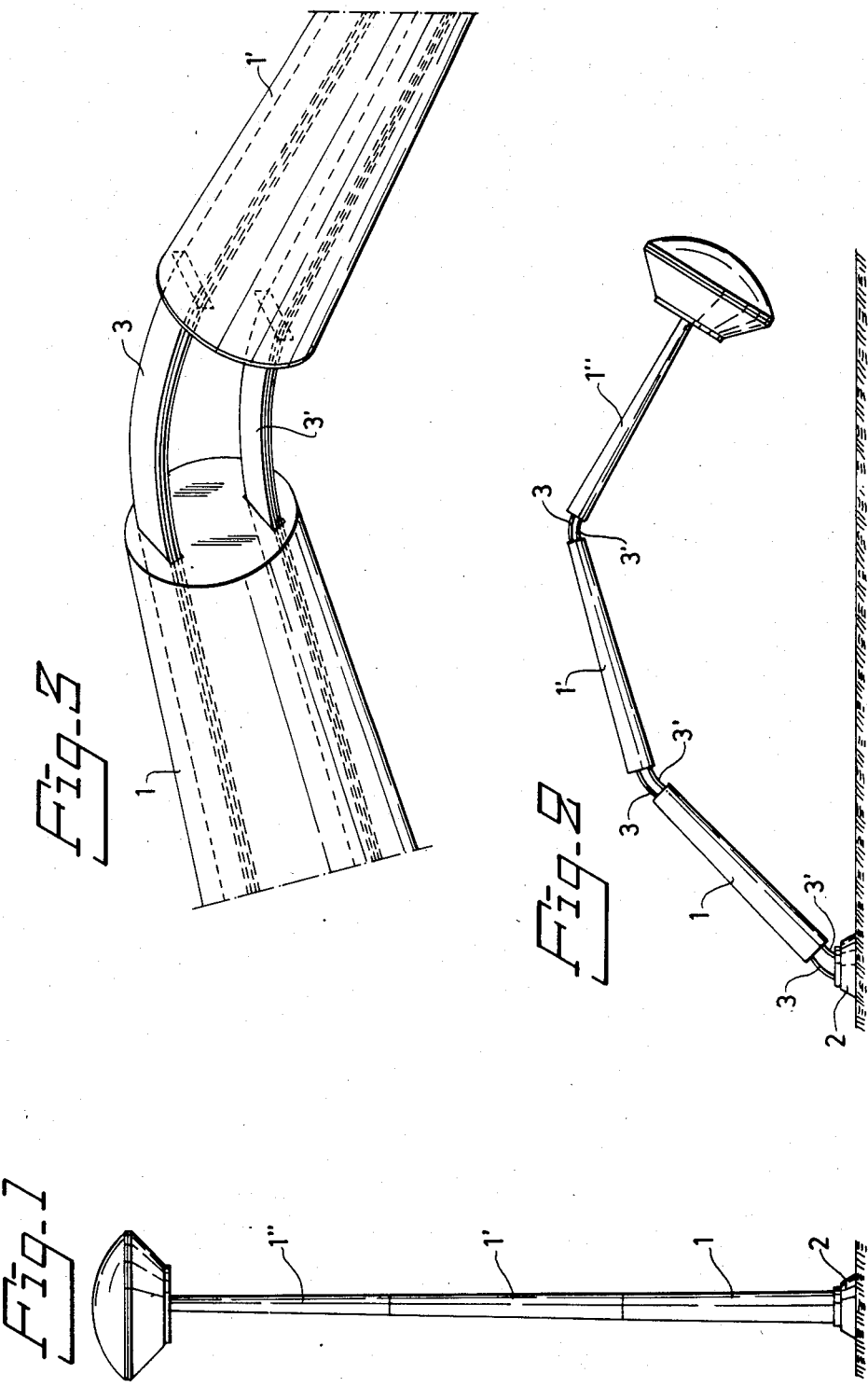

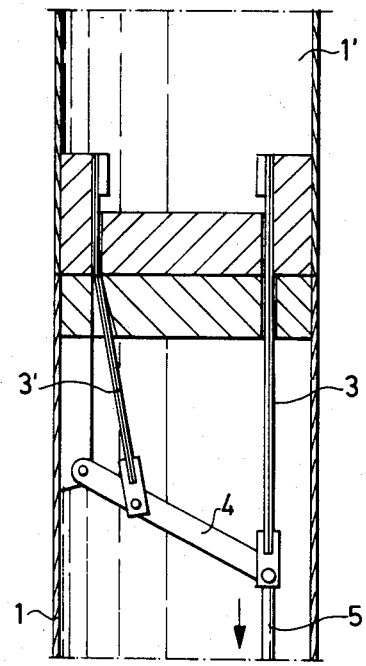
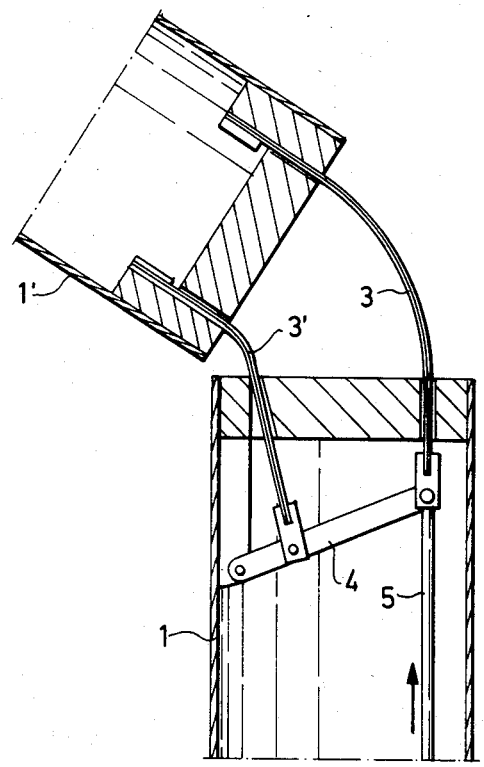
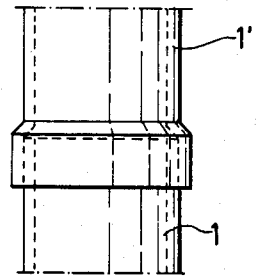
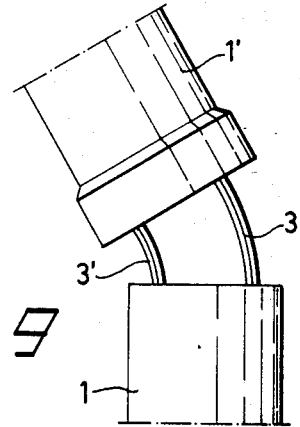

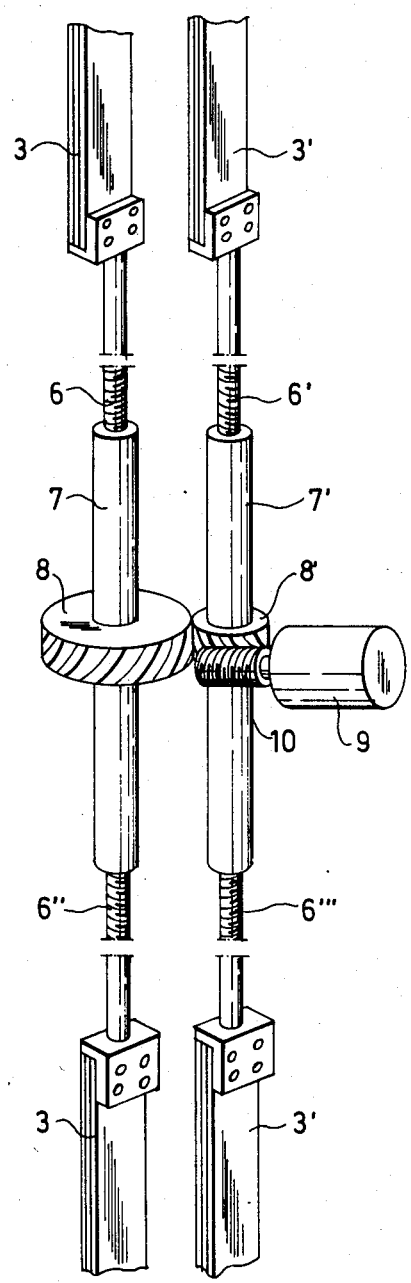
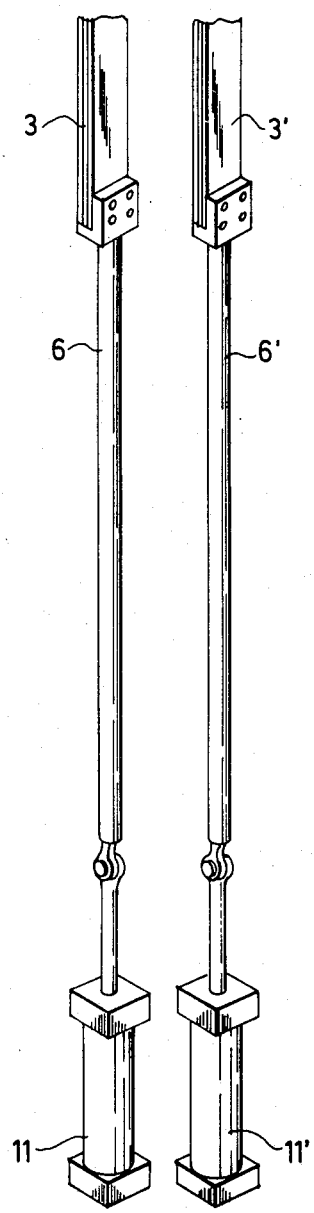

FLEXIBLE JOINT

CROSS REFERENCE TO RELATED APPLICATION(S)

This United States application stems from PCT International Application No. PCT/SE84/00136 filed Apr. 12, 1984.

BACKGROUND OF THE INVENTION

1. Field of the Invention

The present invention relates to a flexible joint, intended to join two elements, and to facilitate changes in the angular orientation of said elements in relation to each other.

2. Description of the Prior Art

In several fields of use, it is desired to join elements in relation to each other in such a way, that the angular relationship of said elements in relation to each other can be changed. Examples of such fields of use are tiltable masts, which are arranged tiltable in relation to a supporting base, crane jibs, having one or several points arranged flexible in the direction of extention, and a number of mechanical designs including flexible links, having angular positions in relation to each other arranged changable.

Previously known designs for the above purpose usually include a pivoting joint, for example with a pin joining the members, and further including means for positioning of the elements in relation to each other, and said additional means may include hydraulically or pneumatically operated cylinder members, co-acting screw and pinion, or similar. For these solutions it is necessary, that a "hinged connection" can be arranged at the flexible location, is that said elements can be arranged pivotable in relation to each other, said previously mentioned additional means only being used for changes in the angular relationship of the elements in relation to each other.

For applications in which the elements for example comprises two tubular members, having adjacently located end portions in close contact when arranged extending linearly in relation to each other in a first position, there are considerable problems to accomplish a flexible joint using conventional techniques. The necessary "hinged connection" must be arranged outside or adjacent to the outer edge portion of each element, if a pivoting movement should be accomplished. Such an external flexible joint is obviously both aesthetically and economically undesirable, but has previously been regarded as necessary, for example when two tubular members in a first position of extension are to be arranged with facing end portions in abutment, and when this position of extension should be adapted to be changed into a second position of extension, in which said abutment is no longer maintained. This problem is further accentuated if two tubular members in a first and linear position of extension are arranged in an each other embracing position, that is when one element has an end portion with such an internal diameter that it can be located embracing adjacent end portion of the second element. If two such elements should be arranged to facilitate positioning in a different angular relationship to each other, the element must first be separated by means of a linear sliding movement, before a pivoting movement can be performed. It is obviously possible to accomplish such a joint using conventional techniques, for example by means of hydraulically or pneumatically operable cylinder members, one being arranged to accomplish the preliminary linear sliding movement, whereafter a second cylinder member can be used to accomplish a pivoting movement. However, it is also necessary to use specially designed joining members to maintain a "hinge acting" connection during the above described movement. It is obvious, that such a design requires considerable space, but also is costly from manufacturing point of view, and that it also requires access to a hydraulical or pneumatical pressure medium. The complicated design also requires regular servicing, and the risk for malfunction is also obvious.

SUMMARY OF THE INVENTION

The object of the present invention is to provide a flexible joint, which substantially completely removes the above disclosed previous disadvantages, and which is well suited to be used for elements having abutting end portions in a first and linearly extending position, but also facilitates use with elements which telescopically embrace each other in such a position of extension. The flexible joint according to the present invention is also well suited to be located at a number and subsequently located points between different elements, whereby, for example a mast can be accomplished having several subsequently located sections, which independently of each other can be inclined in relation to a predetermined plane, for example in relation to the ground plane. A further and not unimportant feature is that the power required for a tilting/raising operation can be reduced to a minimum.

The flexible joint according to the present invention is mainly characterised in that it includes at least two plate spring members, located separated and extending in a substantially parallel relationship, attached to first and in relation to each other adjacently located end portions against a first element, and having opposed end portions moveably attached to a second element, a displacement movement of substantially the same degree for the plate spring members being arranged to move the first element in direction from the second element, whereas a subsequently following movement of the plate spring members with from each other different degree of movement is arranged to pivot the first element in relation to the second element in the direction corresponding to the plane in which the plate spring member extends which has the smallest degree of movement.

BRIEF DESCRIPTION OF THE DRAWINGS

A number of examples of embodiments of flexible joints according to the present invention are more fully described below with reference to the accompanying drawings wherein:

FIG. 1 is a side elevational view of a mast formed by three tubular sections, shown extending vertically in relation to a ground plane.

FIG. 2 is a view similar to FIG. 1, showing the three mast sections located in second directions of extension in relation to the ground plane;

FIG. 3 is an enlarged perspective view of a flexible joint between two mast sections, when located in the position shown in FIG. 2;

FIG. 4 is a cross-sectional view of two adjacently located mast sections, when arranged located adjacent to each other in a linear direction of extension;

FIG. 5 is a cross-sectional view similar to FIG. 4, showing a first mast section arranged extending in an inclined position in relation to the second mast section;

FIG. 6 is a perspective view of an alternative embodiment in relation to FIGS. 4 and 5 for influencing the plate spring members forming the joint;

FIG. 7 is a perspective view of a further alternative embodiment in relation to FIG. 6;

FIG. 8 is a side elevational view of two tubular sections arranged extending linearly, and with one section arranged having an end portion embracing the adjacent end portion of the other section and FIG. 9 is a side elevational view similar to FIG. 8, in which one section is arranged in an angular relationship of extension to the other section.

DETAILED DESCRIPTION

With reference to FIGS. 1 and 2, said figures are intended to disclose how a vertically extending mast or pole can be formed by means of a number of mast sections 1, 1', 1" and how these can be tilted in relation to a supporting base 2. In difference to previously used methods, the linearly and vertically extending mast shown in FIG. 1 is not tilted entirely, but each individual mast section 1, 1', 1" is arranged to take up an inclined position in relation to adjacent mast sections 1, 1', 1", respectively the supporting base 2, whereby the lower mast section 1 takes up a first inclined position in relation to the ground plane, whereas the middle mast section 1' takes up a further inclined position, whereas the upper mast section 1" takes up a position further inclined towards the ground plane. This tilting method has obvious advantages in relation to the tilting of a mast in its entire direction of extension, such as a smaller required surface for accomplishing a tilting operation, as well as smaller load application on the mast sections 1, 1', 1" forming the mast during the tilting operation.

The mast sections 1, 1', 1" used are in this embodiment of tubular type, having adjacent end portions located in abutment against each other when the mast extends linearly. This would cause obvious difficulties when using conventional solutions, since such sections 1, 1', 1" normally must be arranged with an external hinge acting member, in order to facilitate a pivoting movement of the mast sections 1, 1', 1" in relation to each other.

According to the present invention, this problem is solved by joining the mast sections 1, 1', 1" internally by means of at least two plate spring members 3, 3', located separated from each other but extending in substantially the same plane. By causing a simultaneous, but different movement of said plate spring members 3, 3', the mast sections 1, 1', 1", are first moved away from each other, respectively away from the supporting base 2, and as a second step is a pivoting movement caused in direction towards the plane in which the plate spring member 3 is located having the smallest movement. This is further illustrated in FIG. 3. This figure also shows how the end surfaces of the mast sections 1', 1" can be arranged closed having two through slots at each end surface, through which the plate spring members 3, 3' extend.

By dimensioning the plate spring members 3, 3' suitably with regard to cross-sectional area and/or number, as well as with regard to the resilient properties of the material, same can be used as "balancing elements", that is the plate spring members 3, 3' are arranged with regard to degree of tilting and load to act as counterbalancing elements in relation to the forces applied. Utilized groups of plate spring members 3, 3' can internally vary with regard to cross-sectional area and/or plate spring number, in order to form a resilient counterbalance during a tilting or raising operation, the dimensioning preferably being carried out in such a way, that the resilient properties of the plate spring members 3, 3' as much as possible is used to "zero" the force imposed by the mast sections 1, 1', 1". By using these resilient properties as a counterbalance, the force applied to carry out a tilting or raising operation can be reduced to a minimum, and said applied force can be either a pressure force, intended to facilitate a tilting operation, or a combination of a pressure force and a pulling force, the latter force serving as a brake force during the final stage of the tilting operation. The force for accomplishing a tilting or a raising operation can thus be either a positively or negatively applied force, as well as a combination thereof, the normally existing load being substantially balanced out by means of resilient force from the plate spring members 3, 3'.

The method in which the plate spring members 3, 3' can be arranged attached at respective end portions is more fully illustrated in FIGS. 4 and 5, in which two adjacently located end portions of the plate spring members 3, 3' are arranged attached to a mast section 1' whereas the opposed end portions are arranged attached to a link member 4, which is pivotably supported adjacent to one end portion. At the opposed end portion of the link member a piston rod 5 is indicated, intended to facilitate a pivoting movement of the link member between the two positions shown in FIG. 5. According to FIG. 4, the piston rod has been influenced to perform a movement in the direction indicated by means of an arrow and the mast sections 1, 1' thereby take up a linearly extending position in relation to each other, with adjacently located end portions located in an abutting position against each other. If the piston rod 5 thereafter is influenced to perform a movement in direction shown by an arrow in FIG. 5, the plate spring members 3, 3' are moved differently in relation to each other, with a smaller movement for the plate spring member 3, which is attached more adjacent to the pivoting center of the link member 4. This smaller movement causes the adjacent end portions of the mast sections 1, 1' to be slightly separated from each other, whereas the larger movement of the second plate spring member 3' causes the upper mast section 1' to be tilted in relation to the lower section 1, i.e. the mast sections take up the position of extension in relation to each other as shown in FIG. 5.

Obviously the movement of the plate spring members 3, 3' can be performed in a number of different ways, two additional embodiments being shown schematically in FIGS. 6 and 7.

With reference to FIG. 6, it is shown how two separate flexible joints simultaneously can be influenced by arranging adjacent end portions of the plate spring members 3, 3' of the joints arranged connected by means of connecting rods 6, 6', 6", 6"' having the free end portions arranged with threaded portions, arranged right-hand respectively left-hand threaded and internally connected by means of two tubular members 7, 7', arranged with internal and correspondingly threaded portions. At each tubular member 7, 7' a surrounding cog wheel 8, 8' is arranged, having in relation to each other different diameter and in engagement with each other. A motor 9 is also indicated, preferably an electrical motor, having a worm gear 10 attached to the drive shaft, arranged co-acting with one of the cog wheels 8. By driving the motor 9 in alternative directions of rotation, the tubular members 7, 7' can be caused to rotate in alternative directions of rotation, whereby a first direction of rotation is arranged to cause the connecting rods 6, 6', 6'', 6''' to be moved in direction towards each other, whereas a second direction of rotation causes the adjacent end portions of the connecting rods 6, 6', 6'', 6''' to be separated from each other. Said movements are obviously transferred to the plate spring members 3, 3', and since the cog-wheels 8, 8' have different diameters in relation to each other, the resulting movement is also different for associated plate spring members 3, 3'.

FIG. 7 is intended to exemplify a further solution, based on the use of two hydraulically or pneumatically driven cylinder members 11, 11', the piston rods of which are shown connected to two connecting rods 6, 6', which join the piston rod of each cylinder member 11, 11' with an end portion of a plate spring member 3, 3'. The cylinder members 11, 11' can obviously be influenced to perform a different movement in relation to each other, for example by arranging same with a different length of stroke in relation to each other, and the movement can also, during a preliminary stage, be guided as desired, for instance as a simultaneous preliminary and similar movement.

The latter condition, particularly where the movement is guided in such a way that a preliminary and similar movement is first performed, followed by a different movement, facilitates specific advantages, which are more fully described with reference to FIGS. 8 and 9. However, it should be emphasized, that such a movement can also be accomplished in other ways than by use of hydraulically or pneumatically operable cylinder members 11, 11', that is by means of mechanical solutions in which a linear movement during a preliminary stage is transformed into a simultaneous linear movement influencing the plate spring members 3, 3', and in a second stage only being transferred to one of said plate spring members 3, 3'.

The above condition facilitates that two adjacently located sections 1, 1' in a first linear direction of extension in relation to each other, as shown in FIG. 8, are arranged telescopically embracing each other, a condition which considerably stabilizes the position of the sections 1, 1' in relation to each other. As previously disclosed, these sections 1, 1' can now first be linearly moved from each other, whereafter one section 1' is tilted to a different angular location of extension in relation to the other section 1.

The plate spring members 3, 3' utilized to accomplish the flexible joint according to the present invention, allow a bending movement in the plane which corresponds to the plane of the plate spring members 3, 3', and said members, 3, 3' can also easily be designed for intended loads. Accordingly each individual plate spring member 3, 3' can comprise only one element, or of a number of abutting elements, which in the latter case form a unit comparable with a pack of plate springs. The properties of the plate spring members 3, 3' also facilitate a bending operation in a plane corresponding to the plane of said members 3, 3', but prevent any substantial bending in other directions.

Only two plate spring members 3, 3' at each joint have previously been discussed, but this number can obviously be increased, while maintaining the novel and characteristic features of the invention. It is thus quite possible to use three or more separate plate spring members 3, 3' at each flexible joint, and to use suitable relative displacement movement between the used plate spring members 3, 3' to accomplish the intended function.

The method in which the above displacement movement can be accomplished can also be varied in a number of ways apart from what has been shown and described, and the examples of embodiments shown and described are only intended to serve as examples of solutions which can be used, since a number of previously known means for accomplishing substantially linear displacement movements can be applied in connection with the invention.

The present invention is thus in no way restricted to the examples of embodiments shown and described, but can be varied further within the scope of the inventive thought and the following claims.

I claim:

1. A flexible joint comprising:
   at least two plate spring members extending in spaced substantially parallel relationship each having an end portion at opposite ends thereof;
   a first element;
   first end portions of said spring members being attached in adjacent spaced relationship to said first element;
   a second element; and
   opposite end portions of said spring members being moveably attached to said second member so that displacement movement of said spring members of substantially the same amount relative to said second element displaces said first and second elements substantially linearly with respect to each other, and displacement movement of said spring members of different amounts relative to said second element pivots said first element with respect to said second element in the plane substantially passing through said plate spring members in the direction of said plate spring member having the smallest degree of movement.

2. A flexible joint as claimed in claim 1 wherein:
   each plate spring member comprises a plurality of abutting members having a substantially rectangular cross-section, the number and cross-section of said abutting members being selected to produce a counterbalancing resilient force in relation to the load produced by pivoting movement of said first element with respect to said second element to reduce to a minimum the force required for causing the pivoting movement.

3. A flexible joint as claimed in claim 1 and further comprising:
   means for substantially simultaneously producing said displacement movements of said spring members.

4. A flexible joint as claimed in claim 1 and further comprising:
   means for individually and successively producing said displacement movements of said spring members with respect to each other.

5. A flexible joint as claimed in claim 1 and further comprising:
   manually applied means for producing said displacement movement of said spring members.

6. A flexible joint as claimed in claim 1 and further comprising:
   mechanically applied means for producing said displacement movement of said spring members.

7. A flexible joint as claimed in claim 1 and further comprising:

hydraulically applied means for producing said displacement movement of said spring members.

8. A flexible joint as claimed in claim 1 and further comprising:

pneumatically applied means for producing said displacement movement of said spring members.

9. A flexible joint as claimed in claim 1 and further comprising:

at least one additional flexible joint; and means to interconnect respective plate spring members of said flexible joints so that said respective plate spring members of all said joints are moveable simultaneously.

10. A flexible joint as claimed in claim 1 and further comprising:

a link member having an end thereon pivotally connected to said second element;

said opposite end portions of said spring members being connected to said link member in spaced relationship; and said first end portions of said spring members being fixedly connected to said first element.

11. A flexible joint as claimed in claim 1 and further comprising:

solid end portions on said first and second elements adjacent each other; and spaced slots through each solid end portion through which said spring members extend so that said first and second elements are connected by said spring members.

* * * * *